(12) United States Patent
Greene (10) Patent No.: US 9,445,151 B2
(45) Date of Patent: Sep. 13, 2016

(54) SYSTEMS AND METHODS FOR VIDEO SCENE PROCESSING

(71) Applicant: EchoStar Technologies L.L.C., Englewood, CO (US)

(72) Inventor: Gregory H. Greene, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/553,848

(22) Filed: Nov. 25, 2014

(65) Prior Publication Data

US 2016/0150278 A1   May 26, 2016

(51) Int. Cl.
| | |
|---|---|
| *H04N 7/16* | (2011.01) |
| *H04N 21/454* | (2011.01) |
| *H04N 21/438* | (2011.01) |
| *H04N 21/44* | (2011.01) |
| *H04N 21/439* | (2011.01) |

(52) U.S. Cl.
CPC ........ *H04N 21/4542* (2013.01); *H04N 21/438* (2013.01); *H04N 21/4396* (2013.01); *H04N 21/44008* (2013.01)

(58) Field of Classification Search
CPC ............. H04N 21/4532; H04N 7/163; H04N 21/4542
USPC ...................................... 725/25–31; 709/229
See application file for complete search history.

(56) References Cited

U.S. PATENT DOCUMENTS

| | | | | |
|---|---|---|---|---|
| 5,606,374 | A * | 2/1997 | Bertram | H04N 5/44543 345/158 |
| 5,737,028 | A * | 4/1998 | Bertram | H04N 5/44543 348/569 |
| 6,966,065 | B1 * | 11/2005 | Kitazato | H04L 12/18 348/705 |
| 6,993,245 | B1 * | 1/2006 | Harville | H04N 5/76 348/E7.061 |
| 7,020,891 | B1 * | 3/2006 | Lippincott | H04N 7/17318 348/E7.071 |
| 7,356,830 | B1 * | 4/2008 | Dimitrova | G06F 17/30787 375/E7.001 |
| 7,587,520 | B1 * | 9/2009 | Kent | G06T 9/00 345/427 |
| 8,170,375 | B2 * | 5/2012 | Watanabe | H04N 19/172 348/723 |
| 8,949,878 | B2 * | 2/2015 | Dimitrova | H04N 7/163 709/229 |
| 8,970,616 | B2 * | 3/2015 | Lee | G06F 3/1438 345/568 |

(Continued)

*Primary Examiner* — Annan Shang
(74) *Attorney, Agent, or Firm* — Seed IP Law Group PLLC (57) ABSTRACT

A receiving device such as a set-top box or mobile device alters video of a scene that is currently being displayed based on recognition or detection in real time of objects or actions shown in the scene. In some embodiments, those scenes or portions of those scenes in which objects or actions shown in the scene are associated with adult content or other undesirable content are blocked until such objects or actions are no longer detected. In other embodiments, advertisements or factual information may be displayed based on scene content while the scene is playing. This is performed dynamically in real time at the set-top box such that the altered video and items to display need not be inserted or integrated in the video upstream at the remote server or content provider before it reaches the set-top box.

20 Claims, 8 Drawing Sheets

(56) References Cited

U.S. PATENT DOCUMENTS

| | | | | |
|---|---|---|---|---|
| 9,241,122 B2* | 1/2016 | Kim | ............... | H04N 5/44591 |
| 2002/0138847 A1* | 9/2002 | Abrams | ............... | H04N 7/18 |
| | | | | 725/105 |
| 2005/0086692 A1* | 4/2005 | Dudkiewicz | ....... | H04N 5/44543 |
| | | | | 725/46 |
| 2006/0288277 A1* | 12/2006 | Ueda | ............... | G06F 3/0481 |
| | | | | 715/205 |
| 2007/0143818 A1* | 6/2007 | Mashiko | ............... | H04H 60/91 |
| | | | | 725/136 |
| 2007/0296738 A1* | 12/2007 | Louch | ............... | G06F 3/04845 |
| | | | | 345/634 |
| 2008/0194328 A1* | 8/2008 | Shimizu | ............... | A63F 13/10 |
| | | | | 463/34 |
| 2010/0131981 A1* | 5/2010 | Choi | ............... | H04N 5/44543 |
| | | | | 725/40 |
| 2012/0128206 A1* | 5/2012 | Shimada | ............... | G06K 9/00261 |
| | | | | 382/103 |
| 2014/0282733 A1* | 9/2014 | Okumura | ............... | H04N 5/44543 |
| | | | | 725/46 |

* cited by examiner

| Scene identifier | Scene Category | Action To Be Performed |
|---|---|---|
| A | None | None |
| B | Undesireable Material | Block Scene |
| C | None | None |
| D | War Tanks | Pop up War Tank Fun Fact |
| E | Sports Cars | Pop up Sports Car Ad |
| F | None | None |

SYSTEMS AND METHODS FOR VIDEO SCENE PROCESSING

TECHNICAL FIELD

The technical field relates to media content, and particularly to video scene processing of media content.

BRIEF SUMMARY

In one embodiment, a set-top box alters video of a scene that is currently being displayed on a presentation device connected to the set-top box based on recognition or detection in real time of objects or actions shown in the scene. For example, the set-top box may block those scenes or portions of those scenes in which objects or actions shown in the scene are associated with adult content or other undesirable content. In other embodiments, advertisements or factual information may be displayed based on scene content while the scene is playing. This blocking may occur dynamically, such as until the undesirable content is no longer detected. This is performed dynamically in real time at the set-top box such that the altered video and items need not be inserted in the video upstream at the remote server or content provider before it reaches the set-top box.

The set-top box may perform this detection or it may be partially or entirely performed by a remote system "in the cloud" in communication with the set-top box. For example, the remote system compares indications of video frames currently being displayed on the presentation device to stored video frames it has for that program. The set-top box may continuously or periodically send updates to the remote system with this information indicating what scenes and/or frames are currently being displayed or output for display. These indications may be the video frames themselves, compressed versions of the video frames, or identifiers of the video frames. The remote system has stored metadata indicating objects, actions and/or subject matter content associated with the video frame. This metadata is then communicated back to the set-top box such that the set-top box may then make a determination and take action to alter what is being displayed on the presentation device accordingly based on this received metadata. In some embodiments, this determination of what action to take is also performed by the remote system and then commands are sent to the set-top box to perform the actions accordingly based on the metadata regarding the current scene.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
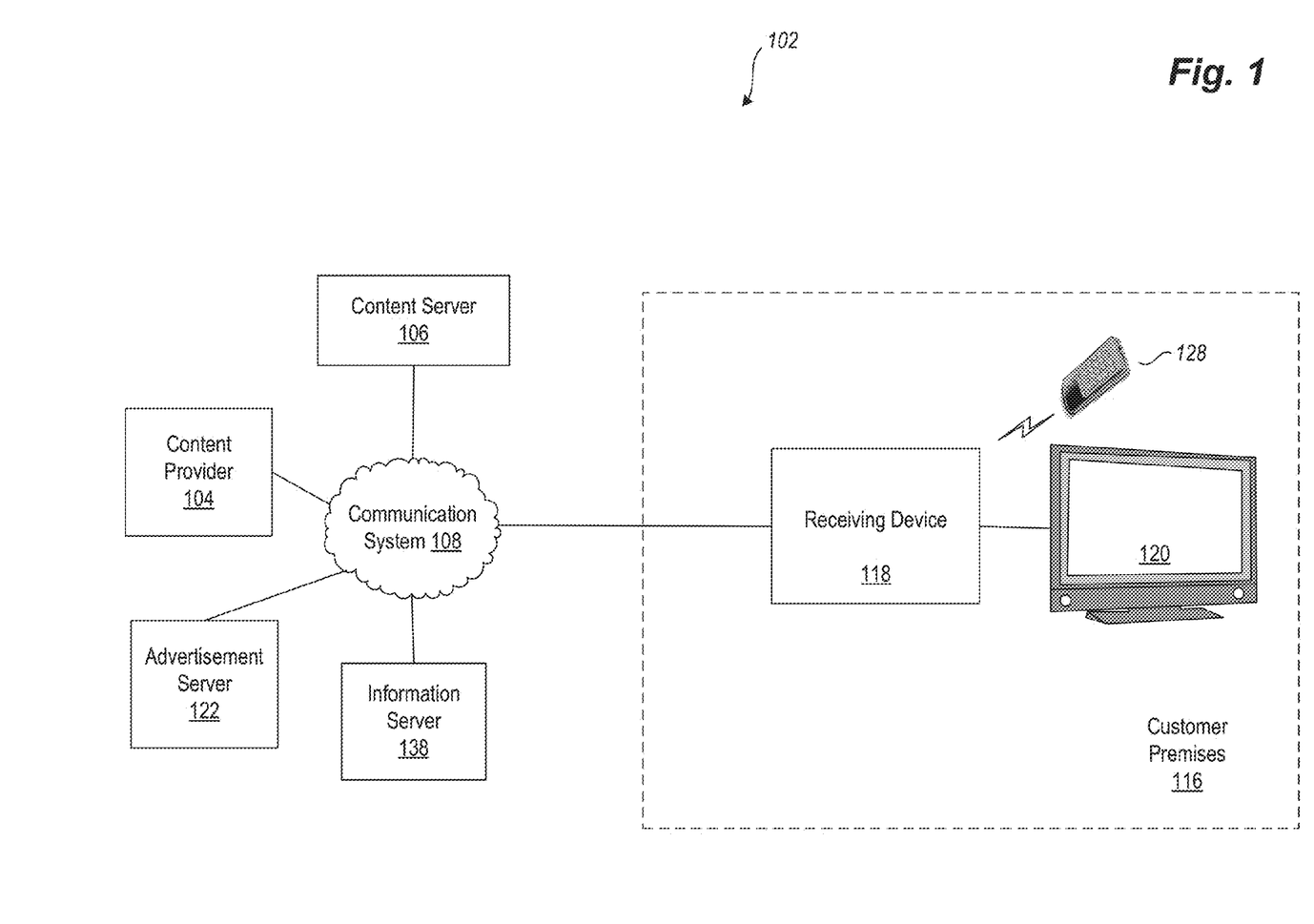
FIG. 1 is a block diagram illustrating an example content distribution environment in which embodiments of video scene processing may be implemented, according to one example embodiment.

FIG. 1 is an overview block diagram illustrating an example content distribution environment in which embodiments of video scene processing may be implemented, according to one example embodiment. Shown in FIG. 1 is a receiving device 118 in operable communication with a presentation device 120. The receiving device 118 may alter video of a scene that is being displayed on the presentation device 120 based on recognition or detection of objects or actions shown in the scene currently being displayed. For example, if objects or actions shown in the scene currently being displayed are associated with adult content or other undesirable content, the receiving device 118 may block those scenes or portions of those scenes until the undesirable content is no longer detected. The receiving device 118 may perform this detection or a remote system in communication with the receiving device 118, such as content provider 104, content server 106 or information server 138, may perform this detection based on indications received from the receiving device 118 of which video program and which frames of the video program are currently being displayed on the presentation device 120. The remote system will then compare these indications of video frames currently being displayed on the presentation device 120 to stored video frames for that program for which the remote system has stored metadata indicating objects, actions and/or subject matter content associated with the video frame. This metadata is then communicated back to the receiving device 118 such that the receiving device 118 may then take action to alter what is being displayed on the presentation device accordingly based on this received metadata.

As another example of how the receiving device 118 may alter what is currently being displayed on the presentation device 120 based on recognition or detection of objects or actions shown in the scene currently being displayed, the receiving device 118 may insert into or display with a scene of the video program currently being displayed on the presentation device 120 advertisements or other additional content or metadata. In some embodiments, the receiving device 118 may determine which advertisements or other additional content or metadata to insert into or display with the current scene being displayed on the presentation device 120. In other embodiments, this determination may be made by a remote system, such as advertisement server 122, content provider 104, content server 106 or information server 138 and communicated to the receiving device 118. In yet other embodiments, this determination may be made based on metadata received from the advertisement server 122, content provider 104, content server 106 and/or information server 138 regarding the current scene being displayed on the presentation device 120. For example, this metadata received from such a remote system may be a subject matter category, the name of an object or action, or rating associated with the current scene being displayed on the presentation device 120.

As explained above, the receiving device 118 may alter what is currently being displayed on the presentation device 120 based on recognition or detection of objects or actions shown in the scene currently being displayed. This may be a user-selectable option and modified based on user selectable options. Selection of such options may be provided to the user via a menu or other graphical user interface element displayed on the presentation device 120 and/or a display panel of the receiving device 118. Such user options may also be provided via user interface elements on the remote control device 128. For example, the user may select to turn on or off the capability to block scenes; select subject matter categories for which scenes are to be blocked; turn on or off the capability to insert into or display with the current scene being displayed advertisements or other additional content or metadata; select which or which type of advertisements or other additional content or metadata to be inserted or displayed; select when and under which conditions to block scenes or insert advertisements or other additional content or metadata; and select subject matter categories for which advertisements or other additional content or metadata are to be inserted or displayed. These options may also be selected and set per user, saved in a user's profile stored on the receiving device or remote system accessible via the receiving device 118, and/or be part of a parental or master user control system accessible via the receiving device 118.

Before providing additional details regarding the operation and constitution of methods and systems for video scene processing, the example content distribution environment 102, within which such a system may operate, will briefly be described.

In the content distribution environment 102, audio, video, and/or data service providers, such as television or streaming media service providers, provide their customers a multitude of video and/or data programming (hereafter, "programming"). Such programming is often provided by use of a receiving device 118 communicatively coupled to a presentation device 120 configured to receive the programming. The programming may include any type of media content, including, but not limited to: television shows, news, movies, sporting events, advertisements, other video or audio, etc.

The receiving device 118 interconnects to one or more communications media or sources (such as a cable head-end, satellite antenna, telephone company switch, Ethernet portal, off-air antenna, content server, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, examples of a receiving device 118 may include, but are not limited to, devices such as: a receiver, a television converter, a set-top box, television receiving device, television receiver, television recording device, satellite set-top box, satellite receiver, cable set-top box, cable receiver, media player, a digital video recorder (DVR), smartphone, mobile device, tablet device, a personal computer (PC), and/or television tuner. Accordingly, the receiving device 118 may be any suitable converter device or electronic equipment that is operable to receive or play back programming. Further, the receiving device 118 may itself include user interface devices, such as buttons or switches.

In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 may include, but are not limited to: a television (TV), a personal computer (PC), a television or computer monitor, sound system receiver, smartphone, mobile device, tablet device, game system, or the like. A presentation device 120 may employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, which may have or control equipment such as such as the content server 106. Example content providers include television stations which provide local or national television programming and special content providers which provide premium-based programming, subscription-based programming or pay-per-view programming.

Program content (i.e., a program including or not including advertisements), is communicated to the content server 106 from the content provider 104 through suitable communication media, generally illustrated as communication system 108 for convenience. Communication system 108 may include many different types of communication media, now known or later developed. Non-limiting media examples include satellite, telephone systems, the Internet, internets, intranets, cable systems, cellular systems, fiber optic systems, microwave systems, asynchronous transfer mode ("ATM") systems, packet-switched systems, frame relay systems, digital subscriber line ("DSL") systems and radio frequency ("RF") systems.

In at least one embodiment, the received program content is converted by the content server 106 into a suitable signal (a "program signal") that is ultimately communicated to the receiving device 118. For example, this program signal may include or represent video data. Other embodiments of the receiving device 118 may receive programming directly from a content server 106, a content provider 104 and/or another Information Server 138 via satellite, locally broadcast RF signals, cable, fiber optic, Internet media, or the like.

In addition, information server 138 may provide various forms of content and/or services to various devices residing in the customer premises 116. For example, information server 138 may also provide metadata to the receiving device 118 regarding a current scene of the video program represented by the video frames that are currently being displayed on the presentation device 120, or regarding advertisements or other additional content or metadata for the receiving device 118 to insert into or display with a scene of the video program currently being displayed on the presentation device 120. Such advertisements or other additional content or metadata may be provided by the advertisement server 122, content provider 104 and/or information server 138 directly to the receiving device 118. In other embodiments, the receiving device 118 may generate such advertisements or other additional content or metadata.

In the illustrated example, the content provider 104, information server 138 and/or advertisement server 122 may receive information from the receiving device 118. For example, the content provider 104, information server 138 and/or advertisement server 122 may receive indications from the receiving device 118 of which program is currently being displayed on the presentation device 120 and/or which video frames of the program are currently being displayed on the presentation device 120. These indications, for example, may include, but are not limited to, program identifiers, program title, program title identifiers, frame identifiers, frame numbers, tags, frame headers, index numbers, temporal sequence number, frame metadata, key-frame identifiers of a current scene, compressed video data representing the frames currently being displayed, etc.

The content provider 104, information server 138 and/or advertisement server 122 may also control the receiving device 118 by sending commands or metadata associated with media content to cause the receiving device 118 to alter what is currently being displayed on the presentation device 120. In some embodiments, the content provider 104 or information server 138 could also send commands to the receiving device 118 through a wired medium (e.g., Ethernet) to the receiving device 118.

In one embodiment, the advertisement server 122 is configured to select particular content for insertion by the receiving device 118 into a media content segment (e.g., a program) provided to the receiving device 118 based on the received indications from the receiving device 118. As previously mentioned, the received indications from the receiving device 118 may indicate which video frames of a program are currently being displayed on the presentation device 120.

The above description of the content distribution environment 102, the customer premises 116, and the various devices therein, is intended as a broad, non-limiting overview of an example environment in which various embodiments of video scene processing may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement video scene processing. Other embodiments of the described techniques may be used for other purposes, including video scene processing for or on other receiving devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
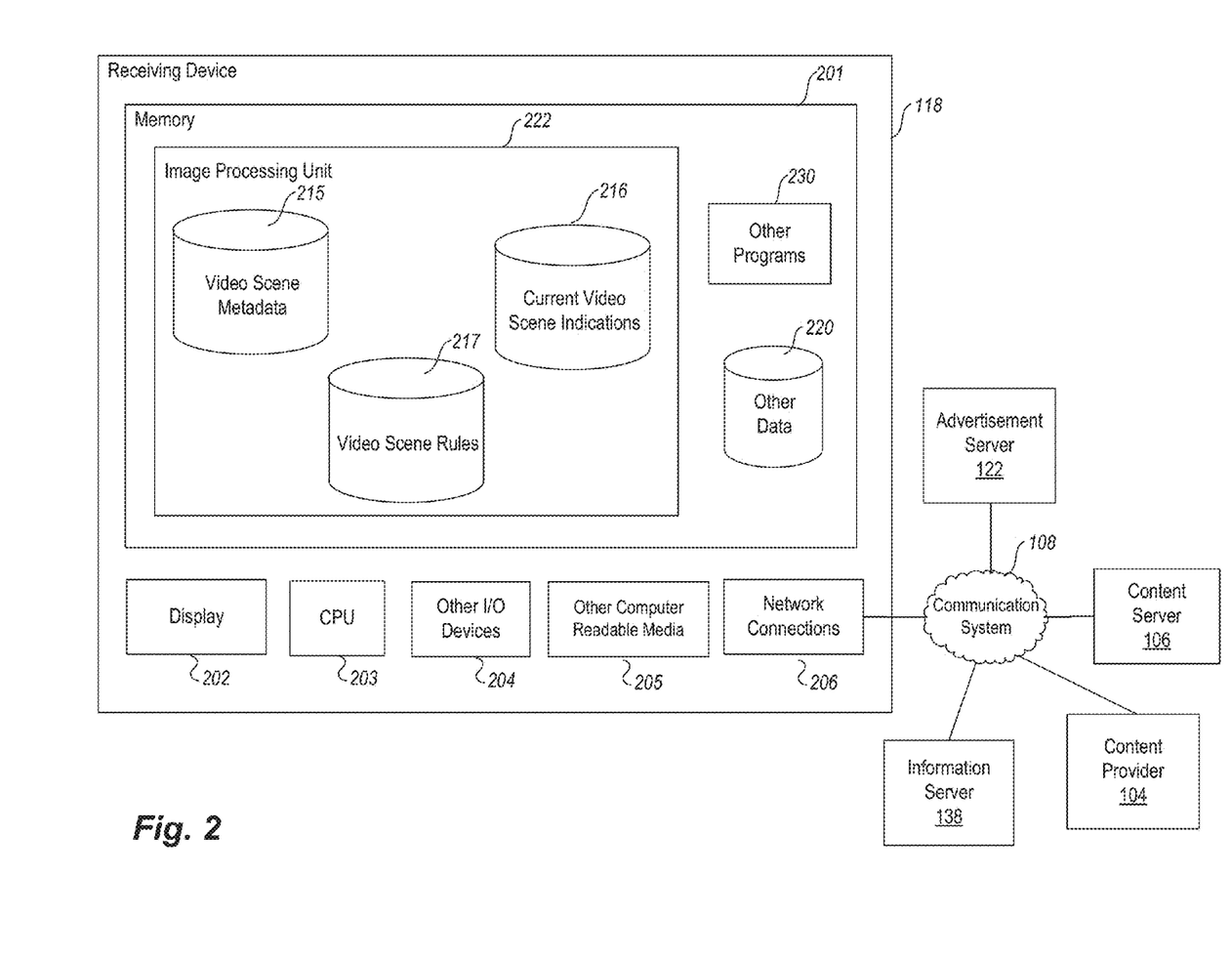
FIG. 2 is a block diagram illustrating elements of an example receiving device used in video scene processing, according to one example embodiment.

FIG. 2 is a block diagram illustrating elements of an example receiving device 118 used in video scene processing, according to one example embodiment.

In one embodiment, the receiving device 118 is a set-top box configured to receive, record and display programming on a presentation device. In other embodiments, the receiving device 118 is a presentation device, such as a television or mobile device.

Note that one or more general purpose or special purpose computing systems/devices may be used to operate the receiving device 118; store information regarding the receiving device 118, video scene metadata, video scene rules, including rules for performing actions based on the video scene metadata, current video scene indications, and communicate with the content provider 104, content server 106, information server 138 and/or advertisement server 122. In addition, the receiving device 118 may comprise one or more distinct computing systems/devices and may span distributed locations. Furthermore, each block shown may represent one or more such blocks as appropriate to a specific embodiment or may be combined with other blocks. Also, the image processing unit 222 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output (I/O) devices 204 (e.g., keyboard, mouse, RF or infrared receiver, light emitting diode (LED) panel, cathode ray tube (CRT) or liquid crystal display (LCD), USB ports, other communication ports, and the like), other computer-readable media 205, and network connections 206. The image processing unit 222 is shown residing in memory 201. In other embodiments, some portion of the contents and some, or all, of the components of the image processing unit 222 may be stored on and/or transmitted over the other computer-readable media 205. The components of the receiving device 118 and image processing unit 222 preferably execute on one or more CPUs 203 and facilitate the receiving, decoding, processing, selecting, recording, playback and displaying of programming, as described herein. The image processing unit 222 also facilitates receiving and storage of video scene metadata, current video scene indications, and video scene rules, and communication with peripheral devices, via the I/O devices 204 and with remote systems (e.g., the content provider 104, the advertisement server 122, the content server 106, and/or the information server 138) via the network connections 206.

Video scene metadata may reside on the video scene metadata repository 215. This video scene metadata may be metadata regarding a current scene of a video program being output by the receiving device 118 for display on the presentation device 120 shown in FIG. 1. For example, the video scene metadata may include information indicating or identifying objects, actions and/or subject matter content associated with a video frame or frames representing the current scene being displayed on, or being output by receiving device 118 for display on, the presentation device 120. This video scene metadata may be received from a remote source, such as content provider 104, content server 106, information server 138 and/or advertisement server 122 in response to the image processing unit 222 sending over communication system 108 indications of which video program and which video frames of the program are currently being displayed on the presentation device 120, or which video program and which video frames of the program are currently being output by receiving device 118 for display. Such indications may be stored or buffered in the current scene indications repository 216.

In some embodiments, the video scene metadata may be generated by the receiving device 118 itself. Whether generated by the receiving device 118 and/or a remote source, such as content provider 104, content server 106, information server 138 and/or advertisement server 122, such metadata may be generated by one or a combination of image processing techniques. For example, for scene-based advertising, the receiving device 118 and/or remote source uses object detection to isolate and potentially identify individual objects in the frame currently being displayed on, or being output for display on, presentation device 120. One embodiment uses a model-based or example-based detection system where the system has, or has access to, a library of models, which can be implemented in a variety of ways. This library of models may be stored in the other data repository 220 or in a remote location accessible over the communication system 108. For example, a model of a bicycle may be stored which includes simple representations of a bicycle at various different positions. Then the receiving device 118 or remote system searches the frame for a close match on one of the representations for the bicycle. Even if this technique does not easily identify occluded objects, it is still sufficient, since a goal is to be relatively confident of the match of a main object in the frame. In other words, if the bike is not the main object in the frame currently being displayed on the presentation device 120, then the system would tend not to display bike-related ads for that scene currently being displayed on the presentation device 120.

As another example, for scene-based ratings locks, one embodiment uses facial recognition to detect the presence of people, then skin texture analysis to determine how much nudity is present. Since the system need not identify specific faces in this embodiment, the facial recognition algorithm uses geometric-based identification which looks for certain features with relative positions, for example, eyes, nose, mouth in a certain position. Once the system has identified a face, then skin texture analysis is utilized using the same texture and color identified in the face to determine the amount of similar skin texture/color that is present in the scene. For example, if the algorithm identifies a face, it then identifies the predominant texture and color of the face, then searches for that in the frame. If there's a certain amount of match for that texture/color surrounding the face (for example, 50% more) then the system could flag the scene as containing nudity.

The video scene rules repository 217 stores rules, instructions and/or options regarding, but not limited to, one or more of the following: performing an action based on the received metadata that results in an alteration of what is being displayed on the presentation device 120; under what circumstances and when an action is to be performed based on the received metadata that results in an alteration of what is being displayed on the presentation device 120; specific actions to perform based on the received metadata; specific actions to perform based on the received metadata that results in an alteration of what is being displayed on the presentation device 120; specific actions to perform based on objects detected or identified in, as indicated by the received metadata, a current scene being displayed on the presentation device 120; specific actions to perform based on options that may be provided to the user via a menu or other graphical user interface element; specific actions to perform based on user profiles; specific actions to perform based on user preferences; specific actions to perform to block scenes; specific actions to perform to block scenes based on selected subject matter categories; specific actions to perform regarding inserting into or displaying with the current scene being displayed advertisements or other additional content or metadata based on the received metadata; specific actions to perform regarding which or which type of advertisements or other additional content or metadata are to be inserted or displayed based on the received metadata; specific actions to perform regarding when and under which conditions to block scenes or insert advertisements or other additional content or metadata; and specific actions to insert or display advertisements or other additional content or metadata for particular subject matter categories. Such rules stored in the video scene rules repository 217 may be selected and set per user, saved in a corresponding user's profile stored in the video scene rules repository 217, other data repository 220 or remote system accessible via the receiving device 118. Such rules stored in the video scene rules repository 217 may also or instead be part of a parental or master user control system profile stored in the video scene rules repository 217, other data repository 220, or remote system accessible via the receiving device 118.

The current video scene indications may be collected by the image processing unit or other programs 230 and communicated via the network connections 206 through the communication system 108 to the content server 106, the content provider 104, information server 138 and/or advertisement server 122 to facilitate generation and receiving of the video scene metadata of the scene currently displayed on the presentation device 120. Also, the image processing unit 222 may interact via the communication system 108 with other devices. For example, the other device may be a home computing system (e.g., a desktop computer, a laptop computer, etc.) that includes or has access to (e.g., via communication system 108) the functionality of the content provider 104, information server 138 and/or advertisement server 122. The corresponding video scene metadata may have come from the receiving device 118 or may have come from an external source.

Other code or programs 230 (e.g., an audio/video processing module, a program guide manager module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and image processing unit 222 include an application program interface ("API") that provides programmatic access to one or more functions of the receiving device 118 and image processing unit 222. For example, such an API may provide a programmatic interface to one or more functions of the image processing unit 222 that may be invoked by one of the other programs 230, the content provider 104, content server 106, information server 138, advertisement server 122, or some other module. In this manner, the API may facilitate the development of third-party interfaces, plug-ins, adapters (e.g., for integrating functions of the image processing unit 222 and information server 138 into desktop applications), and the like to facilitate the video scene processing as described herein, including, for example, performing actions based on the video scene metadata that results in an alteration of what is being displayed on the presentation device 120.

In an example embodiment, components/modules of the receiving device 118 and image processing unit 222 are implemented using standard programming techniques. For example, the image processing unit 222 may be implemented as a "native" executable running on the CPU 203, along with one or more static or dynamic libraries. In other embodiments, the receiving device 118 and image processing unit 222 may be implemented as instructions processed by a virtual machine that executes as one of the other programs 230. In general, a range of programming languages known in the art may be employed for implementing such example embodiments, including representative implementations of various programming language paradigms, including, but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like). Various image, graphics, and video processing platforms, standards, encoding and decoding techniques and APIs may be utilized accordingly in the implementation of the components/modules of the receiving device 118 and image processing unit 222. For example, ITU-R Recommendation BT.601 encoding, more commonly known by the abbreviations Rec. 601 or BT.601 (or its former name, CCIR 601) may be used for broadcast stations, MPEG-4 may be used for online distribution of large videos and video recorded to, MPEG-2 may be used for DVDs, Super-VCDs, and many broadcast television formats, MPEG-1 may be used for video CDs. Also available are H.261, H.263, H.264 encoding also known as MPEG-4 Part 10, or as AVC, used for Blu-ray Discs and some broadcast television formats.

In a software or firmware implementation, instructions stored in a memory configure, when executed, one or more processors of the receiving device 118 to perform the functions of the image processing unit 222. In one embodiment, instructions cause the CPU 203 or some other processor, such as an I/O controller/processor, to perform the actions of the receiving device 118 and image processing unit 222 described herein. For example, this may include, but is not limited to, generating and/or receiving metadata regarding a current scene of the video program currently being displayed on the presentation device 120 and performing actions based on the metadata that results in an alteration of what is being displayed on the presentation device. Some or all of the actions of the receiving device 118 and image processing unit 222 described herein may instead or also be performed by a remote system such as, for example, the content provider 104, content server 106, information server 138, advertisement server 122, or some other module.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including, but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported by the image processing unit 222 implementation. Also, other functions could be implemented and/or performed by each component/module, and in different orders, and by different components/modules, yet still achieve the functions of the receiving device 118 and image processing unit 222.

In addition, programming interfaces to the data stored as part of the receiving device 118 and image processing unit 222, can be available by standard mechanisms such as through C, C++, C#, and Java APIs; libraries for accessing files, databases, or other data repositories; scripting languages such as XML; or Web servers, FTP servers, or other types of servers providing access to stored data. The video scene metadata repository 215, video scene rules repository 217, or current video scene indications repository 216 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including, but not limited to, TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the image processing unit 222.

Furthermore, in some embodiments, some or all of the components of the receiving device 118 and image processing unit 222 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3A:
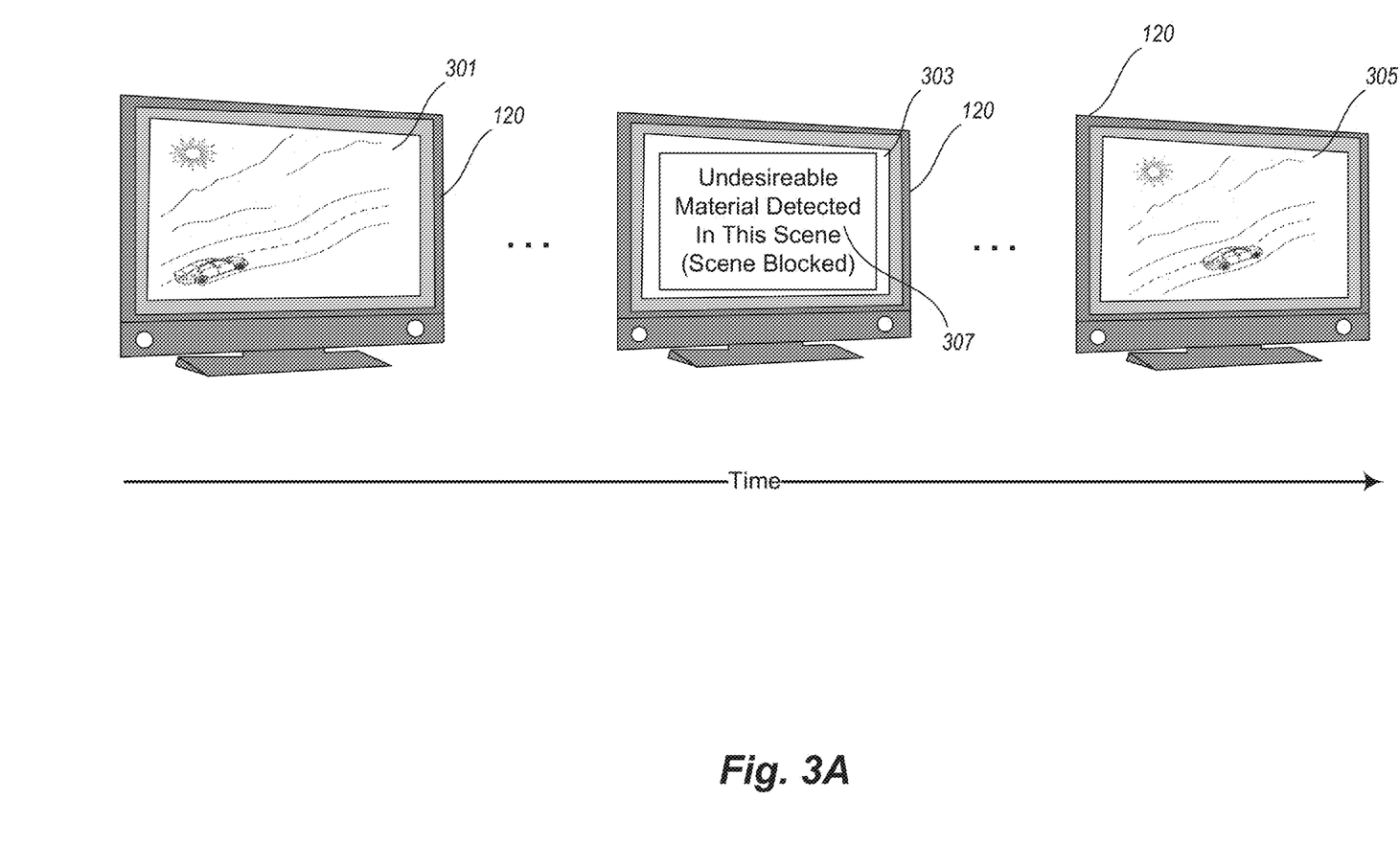
FIGS. 3A and 3B are diagrams showing alterations of particular scenes of a video program being displayed on a presentation device, according to one example embodiment.
Figure 3B:
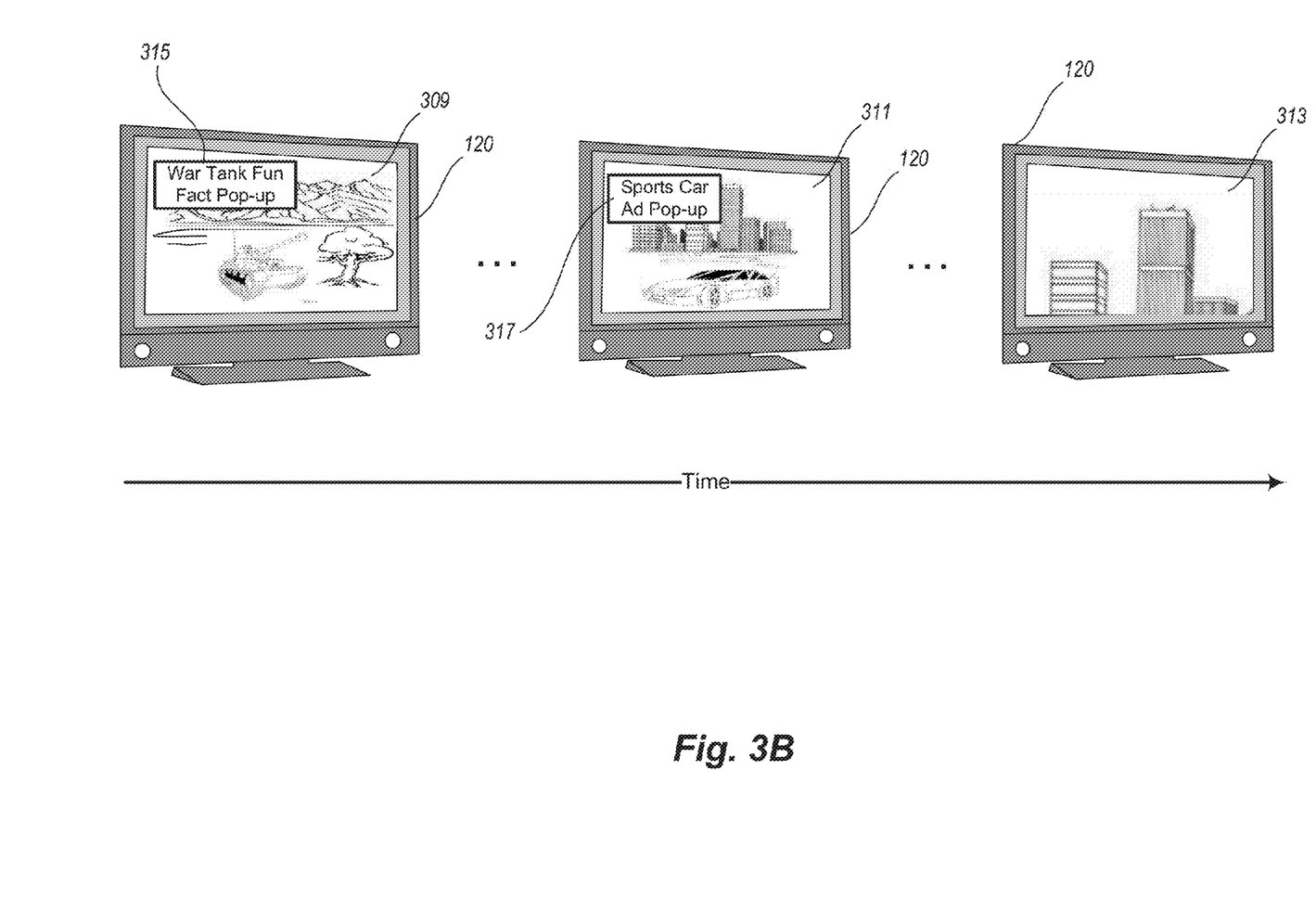

FIGS. 3A and 3B are diagrams showing alterations of particular scenes of a video program being displayed on a presentation device, according to one example embodiment. The example of FIG. 3A shows various scenes of a video program currently being displayed in sequence on presentation device 120. Scene 301 is of a car traveling on a highway. The program then switches to Scene 303 in which undesirable material was detected as being displayed. The receiving device 118 may continuously or periodically send to a remote system indications of which video program and which video frames are currently being generated for output or displayed on the presentation device 120. In particular, in one embodiment, indications of which video program and which video frames of Scene 303 are currently being displayed on the presentation device 120 are sent to a remote system, such as the content provider 104, content server 106 or information server 138. The remote system may have stored metadata regarding that scene corresponding to the sent indications such that it can provide data back to the receiving device 118 to act on accordingly to alter what is being displayed on the presentation device 120. Based on the received indications of which video program is currently being displayed on the presentation device 120, the remote system determines whether the video program currently being displayed on the presentation device is included in a repository of video programs stored at the remote system. If it is determined that the video program currently being displayed on the presentation device 120 is one of the stored video programs, the system then compares the received indications of the video frames of Scene 303 being displayed on the presentation device 120 to the stored video frames. If a match is found, then the system sends metadata regarding the Scene 303 current scene represented by the matching stored video frame. The match need not be a 100% match, but may be a match to a specified threshold, for example, 90%.

In response to receiving the metadata regarding the current scene of the video program currently being displayed on the presentation device 120, the receiving device 118 performs an action based on the received metadata that results in an alteration of what is being displayed on the presentation device 120. In the example provided in FIG. 3A, the received metadata indicates that Scene B contains undesirable material and, in response, the receiving device 118 generates video data 307 to block that scene until the metadata no longer indicates that the current scene of the video program being displayed on presentation device 120 shows a type of material categorized as undesirable. In the example provided in FIG. 3A, this occurs when the program switches back to a different scene, Scene 305, which shows the automobile continuing to drive on the highway. In other embodiments, the functions of the remote system may also or instead be performed by the receiving device 118 as explained above.

In various embodiments, if it is determined the received metadata indicates that the current scene of the video program currently being displayed on the presentation device 120 presents a type of material categorized as undesirable, then the receiving device 118 causes at least one of the following to be performed: muting audio of the current scene of the video program or blocking at least part of the current scene of the video program from being able to be viewed. For example, the blocking at least part of the current scene of the video program from being able to be viewed includes causing at least one of the following to be performed: changing the plurality of video frames that are currently being displayed on the presentation device 120 to be blank frames; blacking out the plurality of video frames that are currently being displayed on the presentation device 120; blocking from being able to be viewed portions of the plurality of video frames that are currently being displayed on the presentation device 120 that show the type of material categorized as undesirable; or scrambling the plurality of video frames that are currently being displayed on the presentation device 120. In the example shown in FIG. 3A, such actions would be performed during Scene 303.

The example of FIG. 3B shows various scenes of a different video program currently being displayed in sequence on presentation device 120. In the example shown in FIG. 3B, an item is displayed on the presentation device 120 based on a subject category associated with the current scene of the video program represented by the video frames that are currently being displayed on the presentation device 120. This may be, for example, based on an object detected or recognized in the current scene being displayed.

In the example of Scene 309, the item caused to be displayed on the presentation device is factual information associated with the subject category associated with the current scene of the video program represented by the video frames that are currently being displayed on the presentation device 120. In particular, a war tank is recognized in Scene 309 and, in response, a war tank fun fact pop-up item 315 is overlaid on or displayed in proximity to Scene 309 on the presentation device 120. This is based on the object detected in Scene 309 being a war tank. In some embodiments the item caused to be displayed on the presentation device 120 is an interactive user interface element associated with the subject category. For example, the user may be able to select the war tank fun fact pop-up item 315 with their remote control device 128 to learn more about war tanks, the historical context in which the war tank was displayed, and/or purchase items associated with war tanks, such as a war tank video game.

In the example of Scene 311, the item caused to be displayed on the presentation device is an advertisement associated with the subject category associated with the current scene of the video program currently being displayed on the presentation device 120. In particular, a sports car is recognized in Scene 311 and, in response, a sports car advertisement pop-up item 317 is overlaid on or displayed in proximity to Scene 311 on the presentation device 120. This is based on the object detected in Scene 311 being a sports car. In some embodiments the item caused to be displayed on the presentation device 120 is an interactive user interface element associated with the subject category. For example, the user may be able to select the sports car advertisement pop-up item 317 with their remote control device 128 to learn more about the sports car in Scene 311, begin a process to purchase the sports car in Scene 311, and/or purchase other items associated with the sports car in Scene 311, such as a T-Shirt or video game featuring the sports car in Scene 311. Such pop-up items may be displayed until the object is no longer detected as being in the scene, for a selectable specified time, or until the user provides input to end the item being displayed. The following Scene 313 shows an example where there is no object detected in the scene for which an action is to be performed to alter what is being displayed on the presentation device 120.

Figure 4:
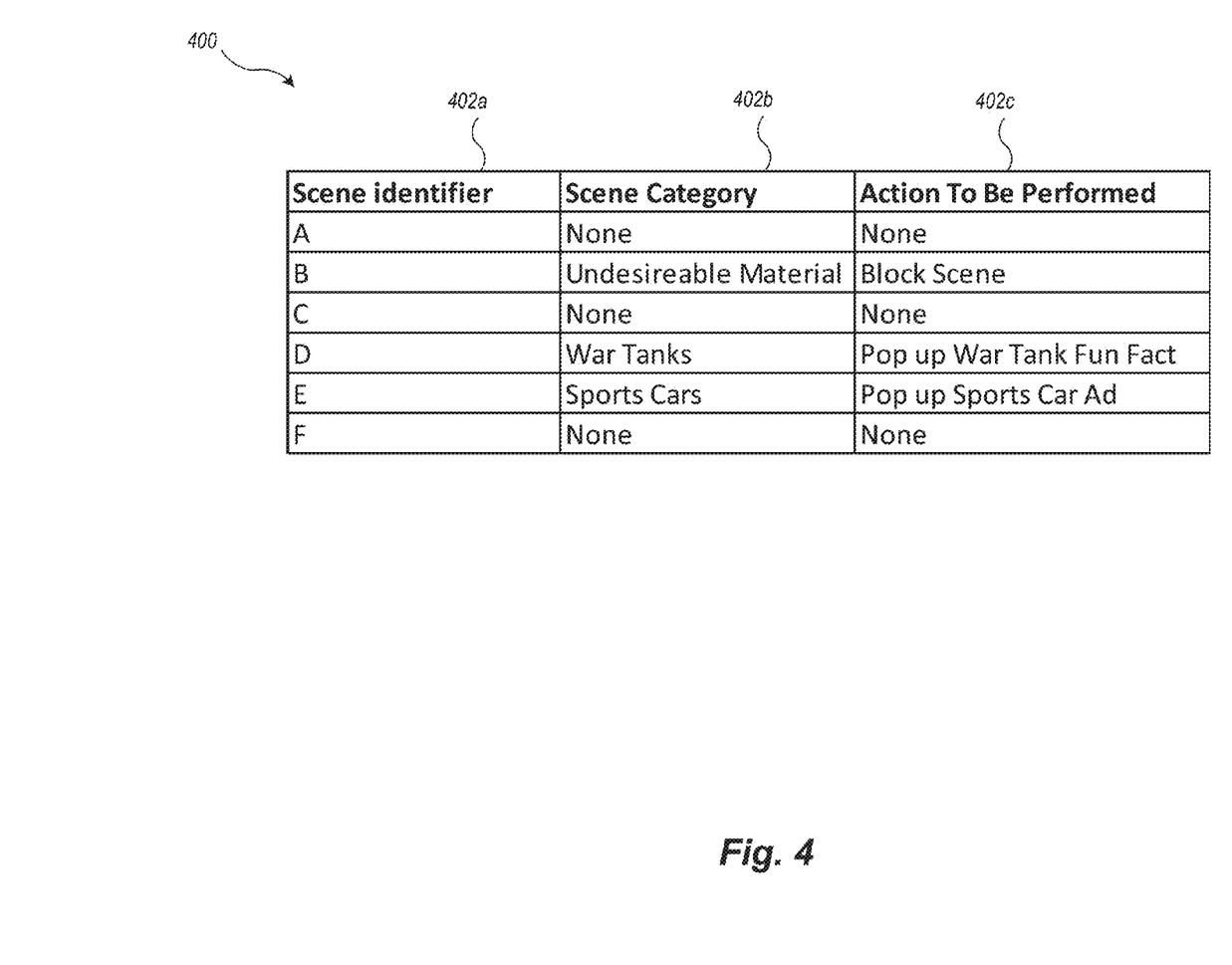
FIG. 4 is a table illustrating example actions to be performed based on various example scene categories, according to one example embodiment.

FIG. 4 is a table 400 illustrating example actions to be performed based on various example scene categories, according to one example embodiment. The table 400 and/or the data represented in the table 400, or portions thereof, may be stored on and/or generated by the receiving device 118 and/or a remote system, such as the content provider 104, content server 106, advertisement server 122 or information server 138 shown in FIG. 1 and FIG. 2. Table 400 shows the actions performed as shown in FIGS. 3A and 3B based on the various example scene categories shown in FIGS. 3A and 3B. In particular, column 402a indicates the scene identifier for various scenes of the video program and column 402b indicates the corresponding category assigned to each scene. Although only six scene identifiers are shown in table 400 for conciseness, video programs in various embodiments may have many more scene identifiers and corresponding scene categories. The corresponding category assigned to each scene as shown in column 402b may be, or be included in, the metadata sent to the receiving device 118 that is used to determine if, when and how to alter what is currently being displayed on the presentation device 120. For example, column 402c indicates what action is to be performed when scenes having the corresponding scene category in that row are encountered. In various embodiments, each scene may have more than one category based on the objects in the scene, actions occurring in the scene and context of the scene with respect to other scenes.

Figure 5:
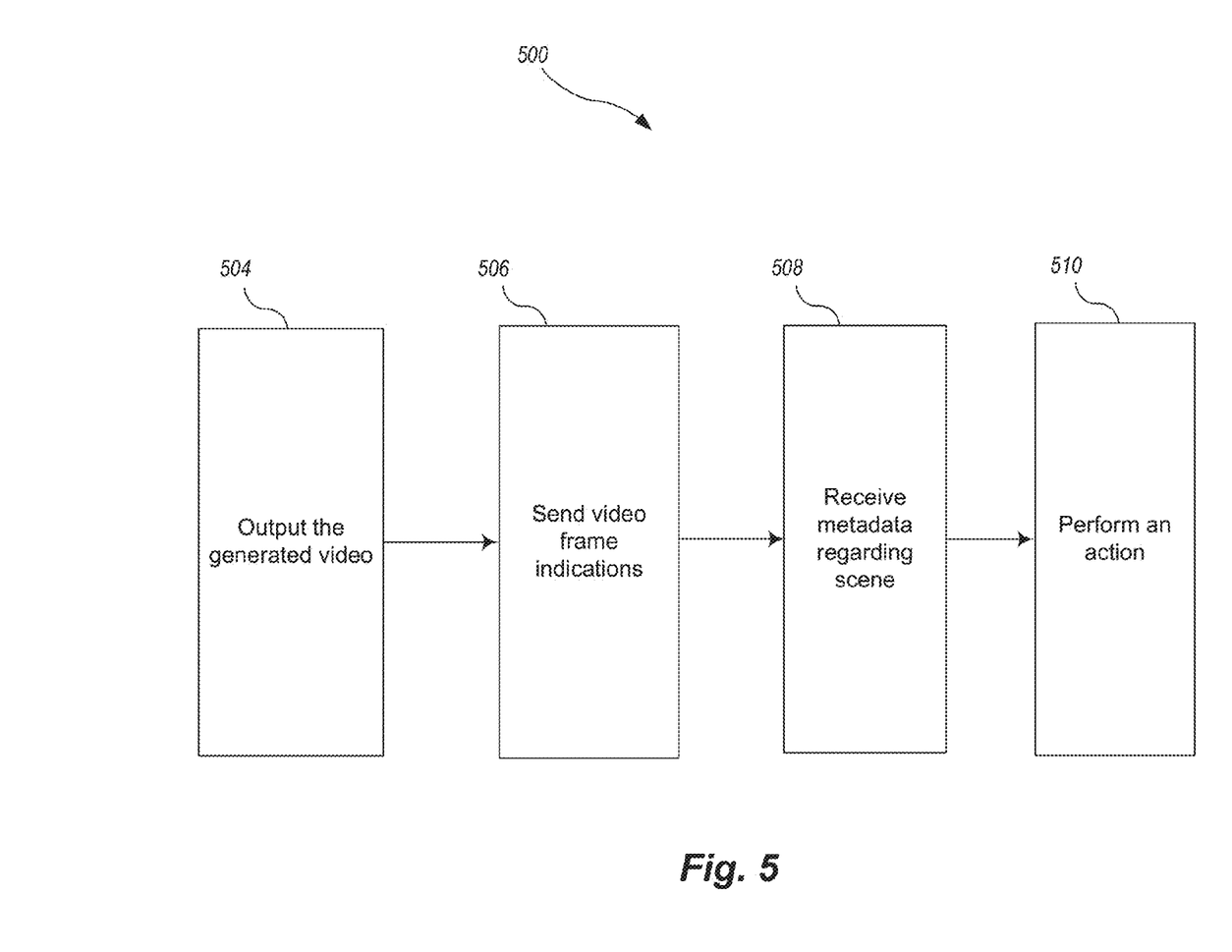
FIG. 5 is a flow diagram of a method of video scene processing based on received metadata regarding a current scene of the video program, according to one example embodiment.

FIG. 5 is a flow diagram of a method 500 of video scene processing based on received metadata regarding a current scene of the video program, according to one example embodiment.

At 504, the receiving device 118 outputs video it generated to the presentation device 120 for display on the presentation device 120.

At 506, the receiving device 118 sends indications of which video frames are being displayed on the presentation device 120. For example, the indication may be sent to a remote system, such as content provider 104, content server 106, information server 138 and/or advertisement server 122.

At 508, the receiving device 118 receives metadata regarding a current scene of the video program represented by frames currently being displayed. For example, the metadata may be received from a remote source such as content provider 104, content server 106, information server 138 and/or advertisement server 122.

At 510, the receiving device 118 performs an action based on the received metadata that alters what is being displayed. For example, the receiving device 118 may cause to be displayed on the presentation device 122 an advertisement associated with the subject category associated with the current scene of the video program currently being displayed on the presentation device 122.

Figure 6:
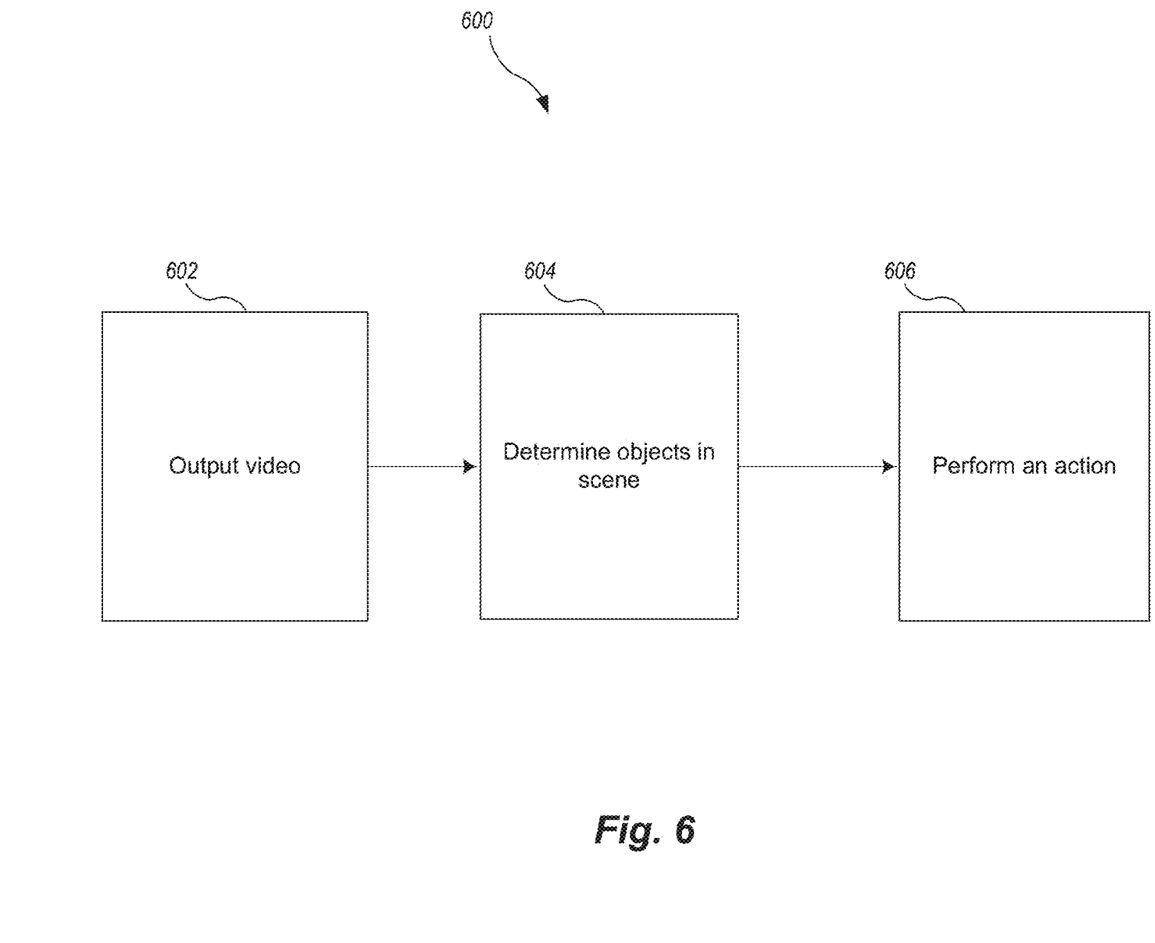
FIG. 6 is a flow diagram of a method of video scene processing based on objects shown in a current scene of the video program, according to one example embodiment.

FIG. 6 is a flow diagram of a method 600 of video scene processing based on objects shown in a current scene of the video program, according to one example embodiment.

At 602, the receiving device 118 outputs video to a presentation device 120 for display on the presentation device 120.

At 604, the receiving device 118, or a system remote from the receiving device 118, determines objects shown in scenes represented by video frames that are currently being displayed.

At 606, the receiving device 118, based on which objects are determined to be currently shown in scenes, performs an action altering what is being displayed.

Figure 7:
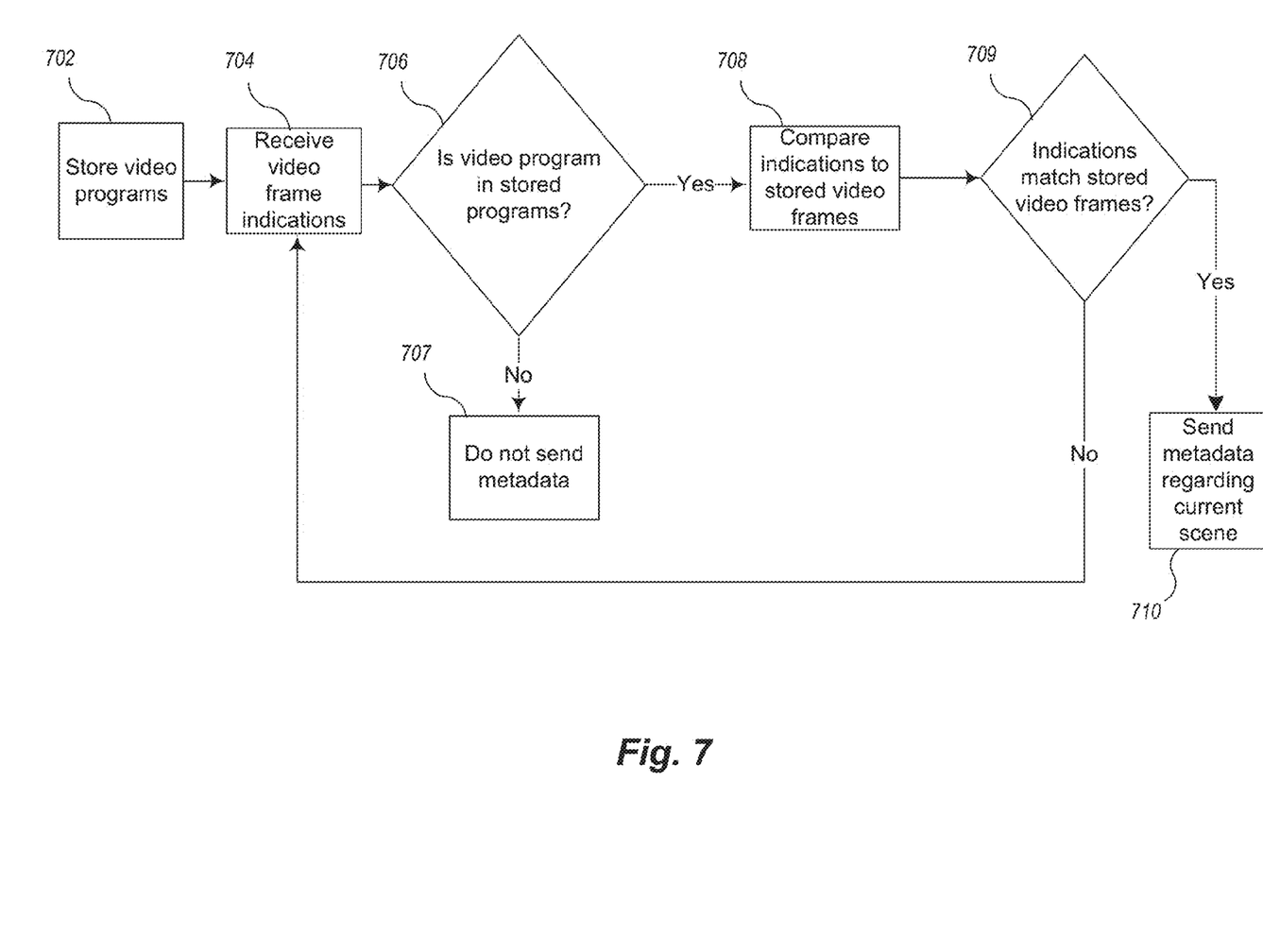
FIG. 7 is a flow diagram of a method of video scene processing including sending metadata regarding a current scene being displayed, according to one example embodiment.

FIG. 7 is a flow diagram of a method 700 of video scene processing including sending metadata regarding a current scene being displayed, according to one example embodiment.

At 702, the receiving device 118, or a system remote from the receiving device 118, stores a plurality of video programs including a plurality of digital video frames.

At 704, the receiving device 118, or a system remote from the receiving device 118, receives indications of which video program and which frames of the video program are currently being displayed on a presentation device 120. For example, a system remote from the receiving device 118, such as content provider 104, content server 106, information server 138 and/or advertisement server 122, may receive the indications from the receiving device 118. In other embodiments, the receiving device 118 may receive the indications from an internal component of the receiving device 118, such as image processing unit 222 shown in FIG. 2.

At 706, the receiving device 118, or a system remote from the receiving device 118, based on the received indications, determines whether the video program currently being displayed is included in the stored plurality of video programs. If the video program currently being displayed is not included in the stored plurality of video programs, then the process proceeds to 707 and no metadata is sent regarding the scene currently begin displayed because there is no metadata available for that particular video program. If the video program currently being displayed is included in the stored plurality of video programs, then the process proceeds to 708.

At 708, the receiving device 118, or a system remote from the receiving device 118, then compares the received indications to the stored plurality of digital video frames. If the video frame being displayed on the presentation device does not match a stored video frame, then the process returns to 704 where the system continues to receive video frame indications for subsequent video frames of the video program being displayed. If the video frame being displayed on the presentation device matches a stored video frame, then the process continues to 710.

At 710, the receiving device 118, or a system remote from the receiving device 118, sends metadata regarding a current scene represented by the matching stored video frame. For example, a system remote from the receiving device 118, such as content provider 104, content server 106, information server 138 and/or advertisement server 122, may send the metadata to the receiving device 118 such that the receiving device 118 may take an action accordingly to alter what is being displayed on the presentation device 120.

While various embodiments have been described hereinabove, it is to be appreciated that various changes in form and detail may be made without departing from the spirit and scope of the invention(s) presently or hereafter claimed.

The invention claimed is:

1. A method in an electronic video scene processing system comprising:
   receiving, by the electronic video scene processing system, video data from a remote source;
   generating, by the electronic video scene processing system, video for presentation on a presentation device based on the video data received from the remote source, the generated video including a plurality of video frames;
   outputting, by the electronic video scene processing system, the generated video to the presentation device for display on the presentation device;
   while outputting the generated video to the presentation device, sending, by the electronic video scene processing system, indications of which video frames of the plurality of video frames are currently being displayed on the presentation device;
   in response to the sending indications of which video frames of the plurality of video frames are currently being displayed on the presentation device, receiving, by the electronic video scene processing system, metadata regarding a current scene of a video program represented by the video frames of the plurality of video frames that are currently being displayed on the presentation device; and in response to receiving the metadata regarding the current scene of the video program represented by the video frames of the plurality of video frames that are currently being displayed on the presentation device, performing, by the electronic video scene processing system, an action based on the received metadata that results in an alteration of what is being displayed on the presentation device.

2. The method of claim 1 wherein the performing an action based on the received metadata that results in an alteration of what is being displayed on the presentation device includes:
determining whether the received metadata indicates that the current scene of the video program represented by the video frames of the plurality of video frames that are currently being displayed on the presentation device presents a type of material categorized as undesirable;
as a result of the determining, if it is determined the received metadata indicates that the current scene of the video program represented by the video frames of the plurality of video frames that are currently being displayed on the presentation device presents a type of material categorized as undesirable, then causing at least one of the following to be performed: muting audio of the current scene of the video program or blocking at least part of the current scene of the video program from being able to be viewed.

3. The method of claim 2 wherein the blocking at least part of the current scene of the video program from being able to be viewed includes causing at least one of the following to be performed: changing the plurality of video frames that are currently being displayed on the presentation device to be blank frames; blacking out the plurality of video frames that are currently being displayed on the presentation device; blocking from being able to be viewed portions of the plurality of video frames that are currently being displayed on the presentation device that show the type of material categorized as undesirable; or scrambling the plurality of video frames that are currently being displayed on the presentation device.

4. The method of claim 2 wherein the blocking at least part of the current scene of the video program from being able to be viewed includes blocking at least part of the current scene of the video program from being able to be viewed until the received metadata regarding the current scene of the video program represented by the video frames of the plurality of video frames that are currently being displayed on the presentation device no longer indicates that the current scene of the video program shows a type of material categorized as undesirable.

5. The method of claim 2 wherein the type of material categorized as undesirable is selected from the group comprising: adult content, sexual content, nudity, violence, drug abuse, or material having a specified content rating.

6. The method of claim 1 wherein the performing an action based on the received metadata that results in an alteration of what is being displayed on the presentation device includes:
determining from the received metadata at least one subject category associated with the current scene of the video program represented by the video frames of the plurality of video frames that are currently displayed on the presentation device;
as a result of the determining, causing an item to be displayed on the presentation device based on the at least one subject category associated with the current scene of the video program represented by the video frames of the plurality of video frames that are currently being displayed on the presentation device.

7. The method of claim 6 wherein the item caused to be displayed on the presentation device is an advertisement associated with the subject category associated with the current scene of the video program represented by the video frames of the plurality of video frames that are currently being displayed on the presentation device.

8. The method of claim 6 wherein the item caused to be displayed on the presentation device is factual information associated with the subject category associated with the current scene of the video program represented by the video frames of the plurality of video frames that are currently being displayed on the presentation device.

9. The method of claim 6 wherein the item caused to be displayed on the presentation device is a prompt associated with the subject category associated with the current scene of the video program represented by the video frames of the plurality of video frames that are currently being displayed on the presentation device.

10. The method of claim 6 wherein the item caused to be displayed on the presentation device is an interactive user interface element associated with the subject category associated with the current scene of the video program represented by the video frames of the plurality of video frames that are currently being displayed on the presentation device.

11. The method of claim 6 wherein the causing the item to be displayed on the presentation device based on the at least one subject category associated with the current scene of the video program includes:
generating video data representing the item;
outputting to the presentation device the generated video data representing the item to be displayed at a location on the presentation device in proximity to the video frames currently being displayed on the presentation device that are included the video generated based on the video data received from the remote source.

12. The method of claim 1 wherein the sending the indications of which video frames of the plurality of video frames are currently being displayed on the presentation device includes sending the indications to a remote server and the receiving the metadata in response regarding the current scene of the video program represented by the video frames of the plurality of video frames that are currently being displayed on the presentation device includes receiving the metadata from the remote server.

13. The method of claim 1 wherein the sending indications of which video frames of the plurality of video frames are currently being displayed on the presentation device includes sending the indications only for some of the video frames of the plurality of video frames currently being displayed on the presentation device.

14. An electronic video scene processing system comprising:
at least one processor; and
a memory coupled to the at least one processor, wherein the at least one processor is configured to:
output video to a presentation device for display on the presentation device, wherein the outputted video includes a plurality of video frames;
while outputting the video to the presentation device, determine objects shown in scenes represented by video frames that are currently being displayed on the presentation device based on the video being output, wherein the at least one processor is configured to determine objects shown in scenes represented by video frames that are currently being displayed on the presentation device based on the video being output, by being configured to:
perform image analysis on one or more frames of the video frames that are currently being displayed on the presentation device; and
based on the image analysis, recognize an object currently being displayed on the presentation device represented in the one or more frames of the video frames that are currently being displayed on the presentation device, wherein the at least one processor is configured to recognize the object currently being displayed on the presentation device by being configured to perform a matching technique that matches the object to stored representations of objects; and
based on which objects are determined to be shown in scenes represented by the video frames that are currently being displayed on the presentation device, perform an action in response to the determination that results in an alteration of what is being displayed on the presentation device.

15. The system of claim 14 wherein the determination of objects shown in scenes represented by video frames that are currently being displayed on the presentation device includes recognition of actions involving the determined objects, and the performance of the action that is in response to the determination that results in an alteration of what is being displayed on the presentation device is based on the recognition of the actions involving the determined objects.

16. The system of claim 14 wherein the determination of objects shown in scenes represented by video frames that are currently being displayed on the presentation device includes determination of a category of an object that is currently being displayed on the presentation device, and the performance of the action that is in response to the determination that results in an alteration of what is being displayed on the presentation device is based on the determined category of the object.

17. A non-transitory computer-readable storage medium having computer executable instructions thereon, that when executed by a computer processor, cause the following method to be performed:
storing a plurality of video programs, wherein each stored video program includes a stored plurality of digital video frames representing scenes of the stored video program;
receiving an indication of which video program is currently being displayed on a presentation device and indications of which video frames of the video program being displayed on the presentation device are currently being displayed on the presentation device;
based on the received indications of which video program is currently being displayed on the presentation device, determine whether the video program currently being displayed on the presentation device is included in the stored plurality of video programs; and
if it is determined that the video program currently being displayed on the presentation device is one of the stored plurality of video programs, comparing the received indications of which video frames of the video program being displayed on the presentation device are currently being displayed on the presentation device to the stored plurality of digital video frames representing scenes of the stored video program included in the stored plurality of video programs; and
if a video frame being displayed on the presentation device matches a stored video frame of the plurality of stored digital video frames as a result of the comparison, then sending metadata regarding a current scene represented by the matching stored video frame.

18. The non-transitory computer-readable storage medium of claim 17 wherein the metadata regarding the current scene represented by the matching stored video frame indicates a category of material shown in the current scene of the video program represented by the video frames of the plurality of video frames that are currently being displayed on the presentation device.

19. The non-transitory computer-readable storage medium of claim 17 wherein the category of material is selected from the group comprising: adult content, nudity, violence, drug abuse, a specified content rating, a subject associated with the current scene of the video program, or data regarding a subject associated with the current scene of the video program.

20. The non-transitory computer-readable storage medium of claim 17 wherein the storing the plurality of video programs includes storing the plurality of video programs on a server, and the sending the metadata regarding the current scene represented by the matching stored video frame includes sending the metadata to a receiving device that is connected to the presentation device remote from the server.

* * * * *